(12) United States Patent
Stockberger et al.

(10) Patent No.: US 9,541,219 B2
(45) Date of Patent: Jan. 10, 2017

(54) VALVE PACKING SHIELD FOR USE IN HYDROCARBON OPERATIONS

(71) Applicant: GE Oil & Gas Pressure Control LP, Houston, TX (US)

(72) Inventors: Bryan William Stockberger, Houston, TX (US); Keith M. Adams, Houston, TX (US); Travis McEvoy, Houston, TX (US); Guy Mitelman, Houston, TX (US); Christopher Michael Menard, Houston, TX (US)

(73) Assignee: GE OIL & GAS PRESSURE CONTROL LP, Houston, TX (US)

( * ) Notice: Subject to any disclaimer, the term of this patent is extended or adjusted under 35 U.S.C. 154(b) by 95 days.

(21) Appl. No.: 14/457,841

(22) Filed: Aug. 12, 2014

(65) Prior Publication Data

US 2015/0060717 A1    Mar. 5, 2015

Related U.S. Application Data

(60) Provisional application No. 61/871,668, filed on Aug. 29, 2013.

(51) Int. Cl.
| | | |
|---|---|---|
| *F16K 41/08* | (2006.01) |
| *F16K 41/04* | (2006.01) |
| *F16K 41/14* | (2006.01) |
| *F16K 3/02* | (2006.01) |

(52) U.S. Cl.
CPC .............. *F16K 41/08* (2013.01); *F16K 3/02* (2013.01); *F16K 41/04* (2013.01); *F16K 41/14* (2013.01)

(58) Field of Classification Search
CPC .......... F16K 41/08; F16K 41/14; F16K 41/04; F16K 3/02; F16J 15/3204; F02F 7/006; F01L 3/08

USPC ......................................... 251/214, 193–204, 326–329, 251/335.1–335.2; 277/502, 555, 570, 572

See application file for complete search history.

(56) References Cited

U.S. PATENT DOCUMENTS

| | | | | |
|---|---|---|---|---|
| 1,670,241 A | | 5/1928 | Conner | |
| 2,634,145 A | * | 4/1953 | Monahan | F16J 15/3284 277/346 |
| 3,048,362 A | * | 8/1962 | Scarborough | F16K 41/08 251/214 |
| 3,509,890 A | * | 5/1970 | Phillips | F16J 15/3228 134/122 R |
| 3,554,562 A | | 1/1971 | Davis | |

(Continued)

OTHER PUBLICATIONS

PCT Search Report and Written Opinion issued in connection with corresponding Application No. PCT/US2014/051771 on Nov. 5, 2014.

*Primary Examiner* — Marina Tietjen
(74) *Attorney, Agent, or Firm* — Hogan Lovells US LLP (57) ABSTRACT

A valve assembly includes a valve body defining a flow passage and a body cavity perpendicular to the flow passage. A bonnet is secured to the valve body. A valve member is moveable between an open position and a closed position, the valve member blocking the flow passage in the closed position, and allowing flow through the flow passage in the open position. A valve stem is coupled to the valve member. A debris barrier circumscribes the valve stem. The debris barrier comprises a first disk shaped member with a central opening through which the valve stem is inserted, and notches that extend radially from the central opening to define petals with ends that abut the valve stem.

18 Claims, 5 Drawing Sheets

(56) References Cited

U.S. PATENT DOCUMENTS

| | | | |
|---|---|---|---|
| 4,042,248 A * | 8/1977 | Williamitis | F16J 15/3232 277/555 |
| 4,406,303 A | 9/1983 | Kilmoyer | |
| 4,759,529 A * | 7/1988 | Berger | F16K 3/0236 251/174 |
| 2002/0124889 A1* | 9/2002 | Sundararajan | F16K 31/122 137/559 |
| 2011/0132704 A1* | 6/2011 | Hanlon | B60T 7/042 188/156 |

* cited by examiner

VALVE PACKING SHIELD FOR USE IN HYDROCARBON OPERATIONS

CROSS REFERENCE TO RELATED APPLICATION

This application claims priority to and the benefit of U.S. Provisional Application Ser. No. 61/871,668, filed Aug. 29, 2013, titled "Valve Packing Shield," the full disclosure of which is hereby incorporated herein by reference in its entirety for all purposes.

BACKGROUND

1. Field of Invention

This invention relates in general to manual and actuated valves, and in particular to a barrier for prolonging the life of the stem, packing of the bonnet assembly of a valve associated with hydrocarbon operations.

2. Description of Prior Art

Valves can sometimes have a linearly translating member, such as a valve stem, to move the valve between the open and closed positions. A valve actuator can move the valve stem linearly to move the valve between the open and closed positions. A valve bonnet can be located between and join the valve and the valve actuator. A stem packing can be located around the valve stem, between an outer diameter of me valve stem and an inner diameter of a bore of the bonnet, to prevent fluids from escaping around the valve stem.

During operation, environmental factors can cause damage which results in valve degradation and, eventually, failure of the stem packing. As an example, for valves associated with hydrocarbon operations, debris and other impurities from the well fluids can damage valve components. One practice is to apply grease to lubricate the valve in an attempt to reduce the amount of damage and wear. However, the grease erodes away, leaving the valve assembly exposed. As a result, debris collects on the stem and travels up past the back-seating area to the stem packing causing damage.

SUMMARY OF THE DISCLOSURE

The methods aid systems of the current disclosure prolong the life of stem packing and reduce damage to critical sealing components of a valve assembly. The cost of the debris barrier described in embodiments herein represents a minimal incremental, expense over the total cost of a valve assembly, while allowing the valve assembly to have longer operational periods between servicing and maintenance of the valve assembly. The methods and systems of embodiments herein provide a debris barrier that is not a sealing device, but can keep debris and other impurities from steam or other fluid flows from reaching the stem packing.

In an embodiment of this disclosure, a valve assembly includes a valve body defining a flow passage and a body cavity perpendicular to the flow passage. A bonnet is secured to the valve body. A valve member is moveable between an open position and a closed position, the valve member blocking the flow passage in the closed position, and allowing flow through the flow passage in the open position. A valve stem, is coupled to the valve member. A debris barrier circumscribes the valve stem. The debris barrier comprises a first disk shaped member with a central opening through which the valve stem is inserted, and notches that extend radially from the central opening to define petals with ends that abut the valve stem.

In an alternate embodiment of this disclosure, a valve assembly includes a valve body defining a flow passage and a body cavity perpendicular to the flow passage. A bore extends from an exterior of the valve body through a bonnet of the valve assembly and into the body cavity. A valve member is moveable between an open position and a closed position, the valve member blocking the flow passage in the closed position, and allowing flow through the flow passage in the open position. A valve stem is coupled to the valve member, the valve stem extending through the bore, for moving the valve member between the closed position, to the open position. A stem packing circumscribes a portion of the valve stem, and is located in the bore. A planar debris barrier is located in the valve body and circumscribes the valve stem. The debris barrier comprises triangular shaped petals with corners that are in contact with the valve steal.

In yet another embodiment of the current disclosure, a debris barrier for inserting in a valve assembly includes a first disk shaped member. A central opening is located in the first disk shaped member, the central opening defined by petals. The central opening is sized to accept a valve stem of the valve assembly. The petals are urged apart by the valve stem with inner ends of the petals oriented generally axially along the valve stem.

BRIEF DESCRIPTION OF THE DRAWINGS

So that the manner in which the features, advantages and objects of the invention, as well as others which will become apparent, are attained and can be understood in more detail, more particular description of the invention, briefly summarized above may be had by reference to the embodiment thereof which is illustrated in the appended drawings, which drawings form a part of this specification. It is to be noted, however, that the drawings illustrate only a preferred embodiment of the invention, and is therefore not to be considered limiting of its scope as the invention may admit to other equally effective embodiments.

DETAILED DESCRIPTION OF THE DISCLOSURE

The methods and systems of the present disclosure will, now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although, specific terms are employed, they are used in a generic and descriptive sense only and not for the purpose of limitation.

Figure 1:
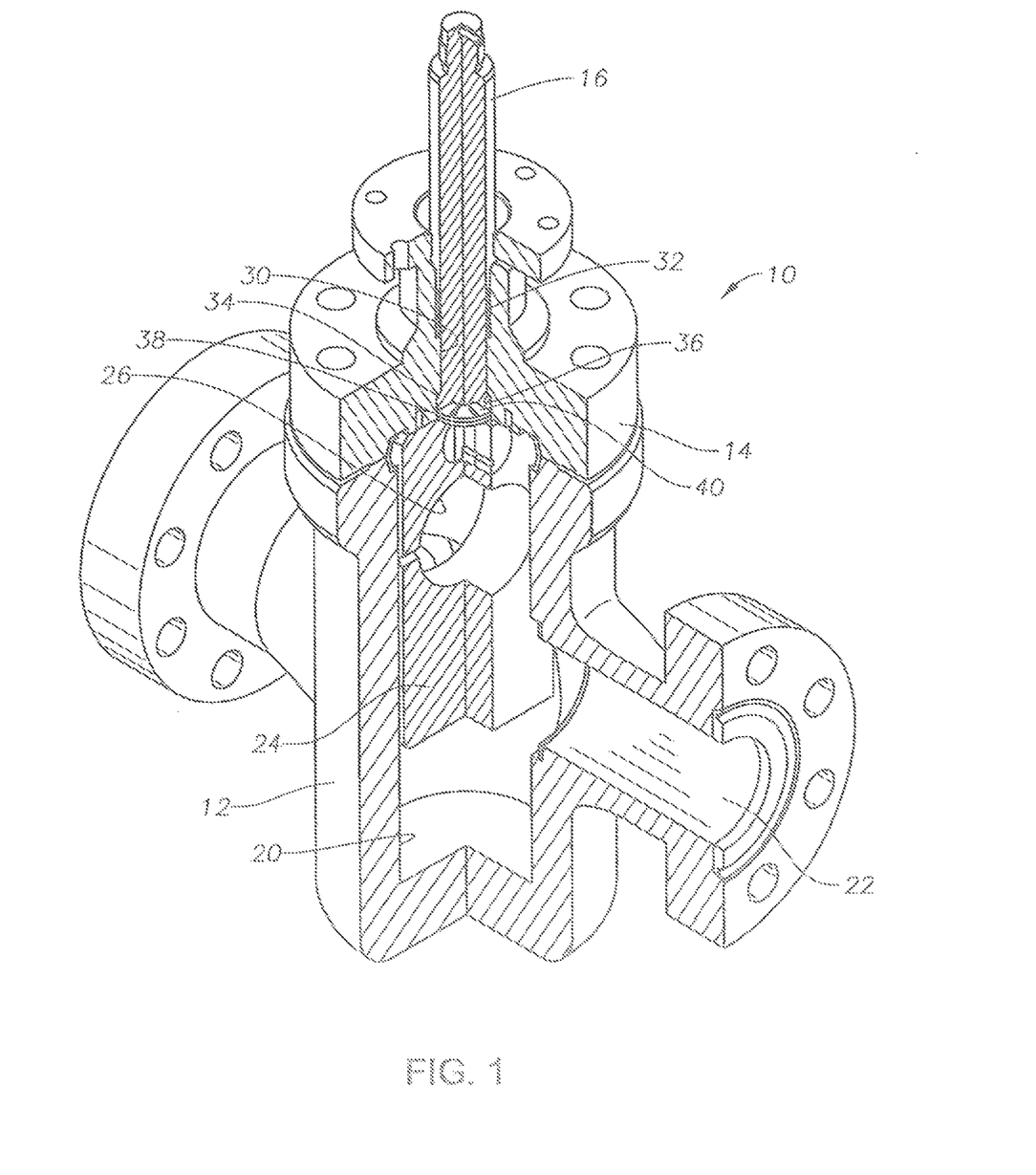
FIG. 1 is a charter sectional view of an example of a valve assembly with a debris barrier, in accordance with an embodiment of the present disclosure.
Figure 2:
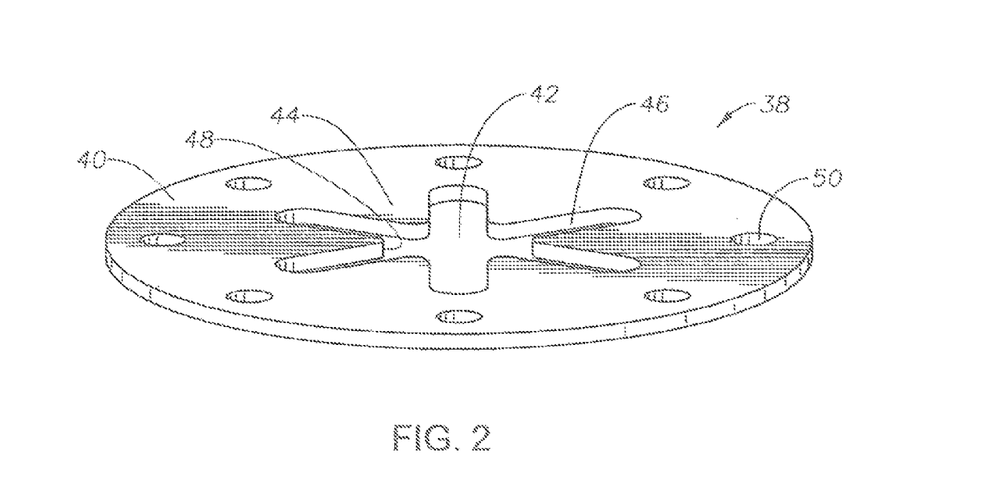
FIG. 2 is perspective view of an example of a debris barrier fox use in the valve assembly of FIG. 1, and in accordance with an embodiment of the present disclosure.
Figure 3:
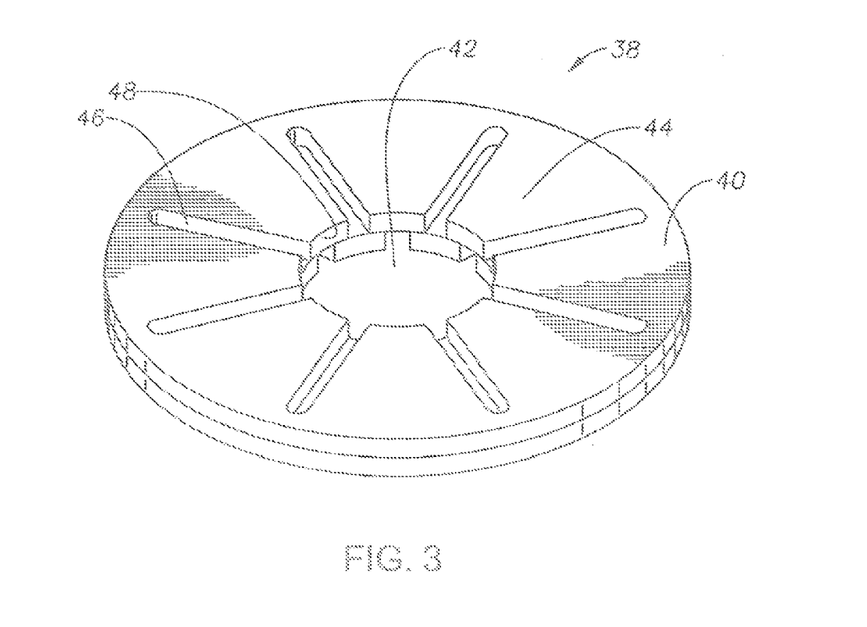
FIG. 3 is a perspective view of an example of a debris barrier having more than one disk shaped member, for rise in the valve assembly of FIG. 1, and in accordance with an embodiment of the present disclosure.

Referring to FIG. 1, valve assembly 10 can be a surface valve or can be located subsea. Valve assembly 10 includes valve body 12 and bonnet 14. Valve body 12 can be, for example associated with a wellhead assembly that is disposed over a well (not shown). The wellhead assembly can include a wellhead housing, a production tree over the housing and flow lines connected to the tree or the wellhead assembly. The flow lines and wellhead assembly can include embodiments of valve assembly 10 described herein. Valve body 12 can also be used for regulating fluids that communicate with the wellhead assembly, or for regulating well and other fluids that are otherwise traveling along a pipeline. Valve stem 16 passes axially through valve bonnet 14, which is secured to valve body 12. In the embodiment of FIG. 1, moving valve stem 16 towards valve body 12 will cause valve body 12 to open. In alternative embodiments, moving valve stem 16 towards valve body 12 will cause valve body 12 to close.

Valve body 12 is a gate valve housing a body cavity 20. A flow passage 22 formed through valve body 12 intersects the body cavity 20. Body cavity 20 is perpendicular to flow passage 22. A valve member 24 is shown within the body cavity 20. Valve stem 16 is coupled to valve member 24 for moving valve member 24 between the closed position and the open position. In the example of FIG. 1, valve member 24 is a gate that is a generally planar member having a solid portion and an opening 26 formed through the solid portion. Valve member 24 is selectively slidable within the body cavity 20 between art open and closed position, wherein valve member 24 blocks flow passage 22 in the closed position, and allows flow through flow passage 22 in the open position. Annular valve seats (not shown) can be located in the flow passage 22 each having an end extending into the body cavity 20. In the embodiment of the valve body 12 shown in FIG. 1, the opening 26 does not register with flow passage 22 and valve body 12 is therefore in the closed position. In the illustrated embodiment valve body 12 is shown as a gate valve, but as one of skill in the art will appreciate, valve body 12 can be any other type of valve that is actuated by the linear extension or translation of a stem, or that is manually moved between the open and closed position by axial or rotational movement of the stem, or by a combination of axial and rotational movement of the stem.

Bore 30 extends from an exterior of valve body 12 through bonnet 14 and into body cavity 20. Valve stem 16 extends through bore 30. Stem packing 32 circumscribes a portion of valve stem 16, and is located in bore 30. Stem packing 32 fills an annulus between an outer diameter of valve stem 16 and an inner diameter of bore 30, to prevent fluids from escaping around valve stem 16.

Valve stem 16 has stem sloped surface 34. Stem sloped surface 34 is a radially outward facing annular shoulder located on an outer diameter of valve stem 16 and proximate to valve member 24. Stem sloped surface 34 is generally oblique to axis Ax and projects downward with distance away from axis Ax. Stem sloped surface 34 selectively mates with bore sloped surface 36 to form a metal to metal seal. Bore sloped surface 36 is a radially inward facing annular shoulder located on an inner diameter of bore 30. Stem sloped surface 34 mates with bore sloped surface 36 when valve stem 16 is moved away from valve body 12.

Figure 5:
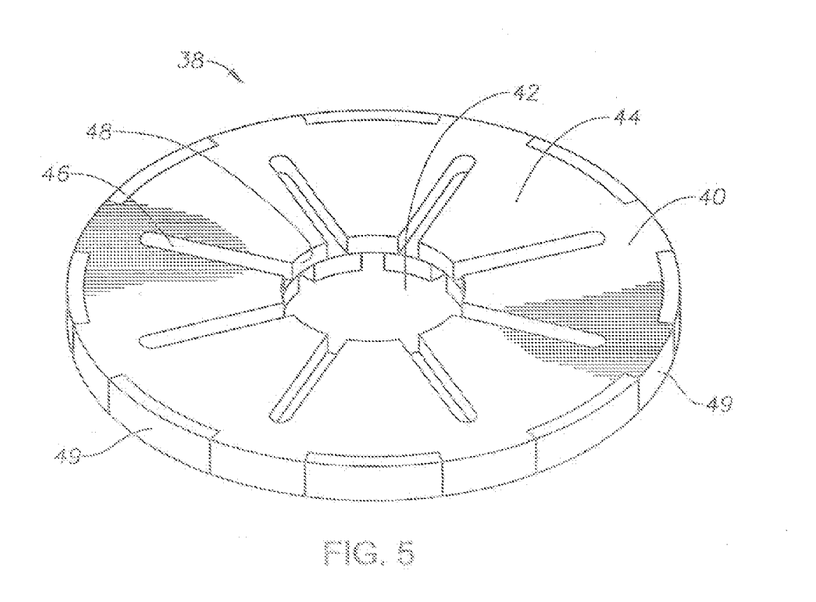
FIG. 5 is a perspective view of an example of a debris barrier having a first and second disk shaped member, each with a connector feature, for use in the valve assembly of FIG. 1, and in accordance with an embodiment of the present disclosure.
Figure 6:
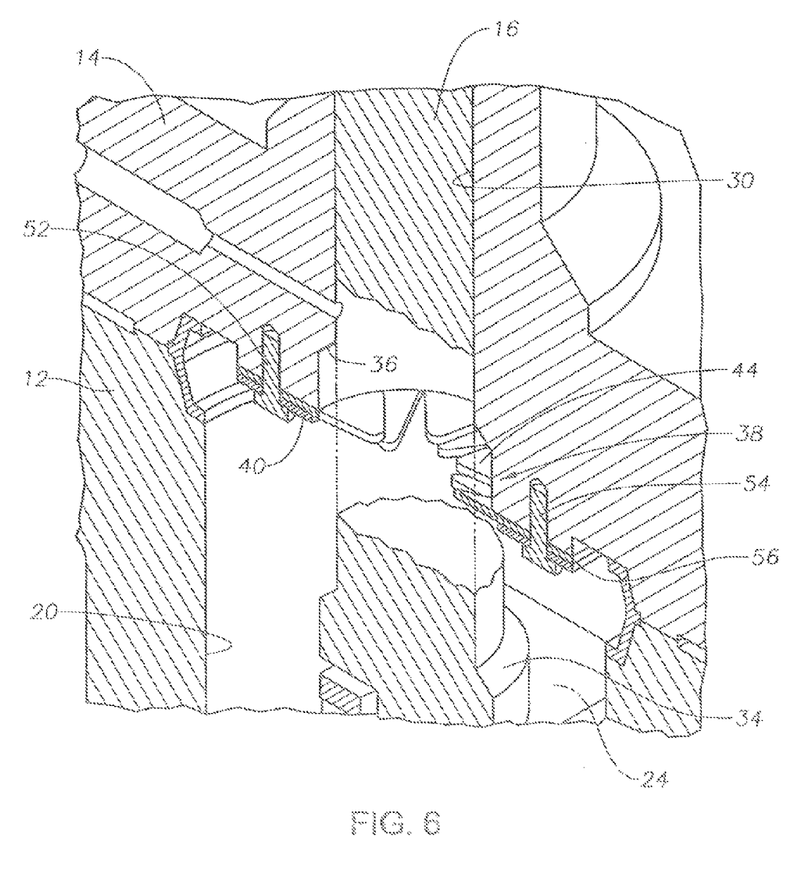
FIG. 6 is a section view of an example of a valve assembly with a debris barrier and retainer ring, in accordance with an embodiment of the present disclosure.

Debris barrier 38 is shown mounted in valve assembly 10. Looking now at FIGS. 1-7, debris barrier 38 is planar and circumscribes valve stem 16. Debris barrier 38 is located within bore 30 and in the embodiment of FIGS. 1 and 6, is located at an intersection of valve body 12 and bonnet 14. Debris barrier 38 is located, axially nearer to valve member 24 than stem packing 32 so that fluids in body cavity 20, as well as debris and other impurities in the fluids, would come into contact with debris barrier 38 before coming into contact with stem packing 32. In the example of FIGS. 1 and 6, debris barrier 38 is also located axially nearer to valve member 24 than, bore sloped surface 36 so that fluids in body cavity 20, as well as debris and other impurities in the fluids, would come into contact with debris barrier 38 before coming into contact with bore sloped surface 36. In alternate embodiments, debris harder 38 can be located in bore 30 between bore sloped surface 36 and stem packing 32. An outer diameter of debris barrier 38 is greater than or equal to the inner diameter of the of bore 30.

Looking again at FIGS. 1-7, debris barrier 38 includes at least one disk shaped member 40 with central opening 42 which extends axially through the mid portion of disk shaped member 40. Debris barrier 38 does not form a seal around valve stem 16 or between, valve stem 16 and bore 30. Central opening 42 is sized to unsealingly accept valve stem 16, so that the pressure within valve body 12 will be the same on the axially upper side of debris barrier 38 as it is on the axially lower side of debris barrier 38.

Central opening 42 is defined by ends of petals 44 that surround central opening 42. Petals 44 cast be generally triangular shaped and separated from each other by notches 46. In certain embodiments, each notch 46 is a slit with little to no width so that a side of each petal 44 is in contact with the sides of each adjacent petal 44 when debris barrier 38 is in a relaxed state. In other embodiments, each notch 46 can have a defined width so that the side of each petal 44 is spaced apart from the sides of each adjacent petal 44 when debris barrier 38 is in a relaxed state, as shown in FIGS. 2-5. Notches 46 project radially outward in disk shaped member 40 from central opening 42.

Figure 7:
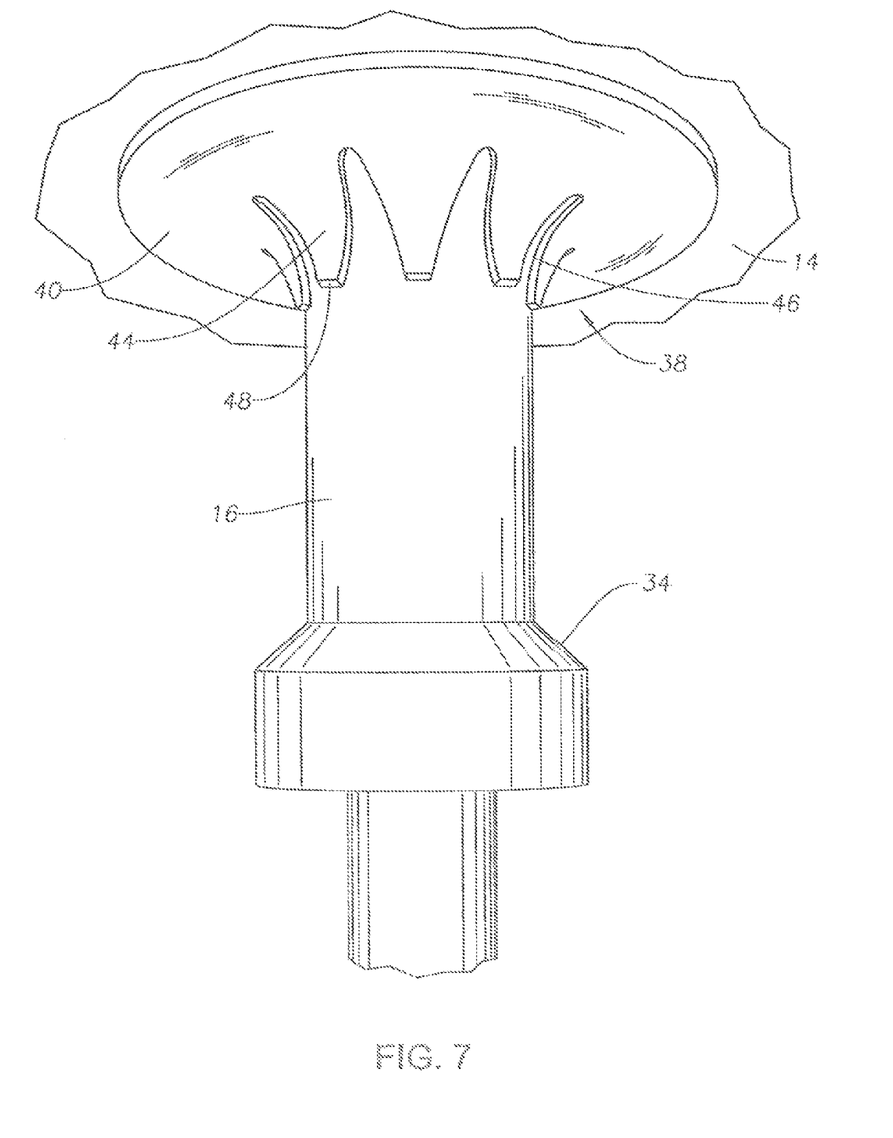
FIG. 7 is a perspective view of an example of a bonnet and valve stem with a debris barrier in accordance with an embodiment of the present disclosure.

In an example, petals 44 are not necessarily rigid and are separable. Radially inner ends 48 of each petal 44 define a petal inner diameter. Valve stem 16 has an outer diameter that is greater than the petal inner diameter so that there is a friction fit between, disk shaped member 40 and valve stem 16, and petals 44 can be urged apart such that each notch 46 becomes a gap between each petal 44. Valve stem 16 extends through the central opening 42, urging petals 44 apart so that inner ends 48 of petals 44 point towards valve member 24 and are oriented generally axially along valve stem 16 (FIG. 7). Inner ends 48 are deflected to a direction parallel with axis Ax. In embodiments, the petal inner diameter can be greater than the enter diameter of valve stem 16, in which case debris barrier 38 can be more rigid and still not impede the movement of valve stem 16. While debris barrier 38 can be flexible; it can also be rigid enough to clear debris from valve stem 16 without collapsing, yet having sufficient flexibility to pass over changes in diameter of valve stem 16, such as stem sloped surface 34. Debris barrier 38 can be formed of an elastomeric material or a semi-rigid material. Debris barrier 38 can be formed of, for example, polyether ether ketone (PEEK), calendered fabric, or para-aramid synthetic fiber weave, such as Kevlar™.

Petals 44 are sized to engage an outer surface of valve stem 16 to prevent debris that accumulates on valve stem 16 from reaching stem packing 32. In other embodiments, petals 44 can be sized to pass over stem sloped surface 34 to prevent debris that accumulates on valve stem 16 from interfering with the metal to metal seal between stem sloped surface 34 and bore sloped surface 36. Debris barrier 38 can remove debris from stem sloped surface 34 prior to valve stem 16 back-seating on bore sloped surface 36; any debris on die stem sloped surface 34 may keep the metal to metal seal between stem sloped surface 34 and bore sloped surface 36 from occurring.

Debris barrier 38 can include first and second disk shaped members 40 or can include a plurality of disk shaped members 40. Each of the disk shaped members 40 circumscribe valve stem 16 and are located within bore 30. Disk shaped members 40 can be stacked adjacent to, and in contact with, each other, or can be axially spaced along an axial length of bore 30. In embodiments having two or more debris barriers 38, notches 46 of each debris barrier 38 can be offset from notches 46 of each adjacent debris barrier 38; and petals 44 of each debris barrier 38 can be offset from petals 44 of each adjacent debris barrier 38. For example, all or a portion of notches 46 of one debris barrier 38 can be rotationally aligned with a portion of petal 44 of an adjacent debris barrier 38 so that notches 46 of the adjacent debris barriers 38 are not rotationally aligned. In embodiments, a sufficient number of debris barriers 38 are used so that one or more petals 44 blocks the straight line path through each of the notches 46.

Figure 4:
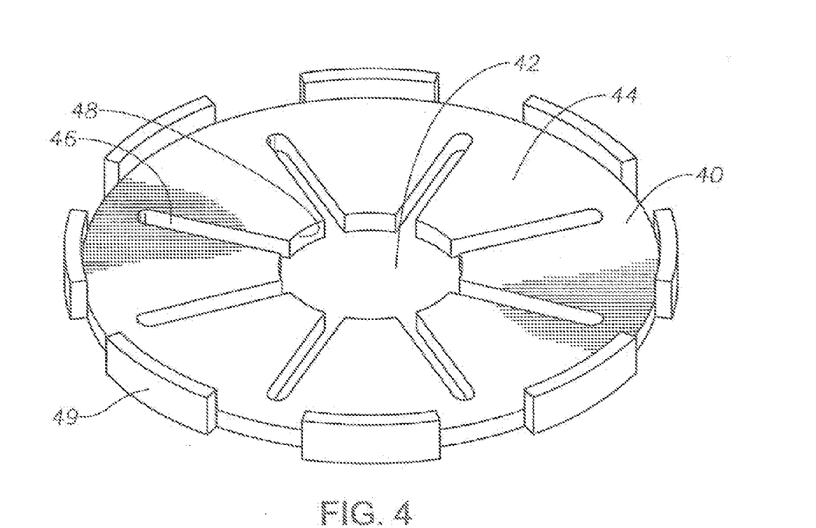
FIG. 4 is a perspective view of an example of a debris barrier having a single disk shaped member with a connector feature, for use in the valve assembly of FIG. 1, and in accordance with an embodiment of the present disclosure.

In examples having at least two disk shaped members 40, disk shaped members 40 can have a connector feature for mating the disk shaped members 40. In the example of FIGS. 4-5, the connector feature can be, for example, male and female dovetail connectors 49a, 49b. Male and female dovetail connectors 49a, 49b can be spaced, around an outer diameter of disk shaped member 40 and extend axially. Dovetail connectors 49 of adjacent disk shaped members 40 can nest and mate to restrict relative rotational movement between the adjacent disk shaped members 40.

Returning to FIGS. 1-7, debris barrier 38 is fixed axially relative to bonnet 14 and valve stem 16 moves axially within central opening 42 of debris barrier 38 as valve member 24 moves between the open position and the closed position. The retaining force between bonnet 14 and debris barrier 38 is greater than the friction three between the petal inner diameter and the outer diameter of valve stem 16, so that valve stem 16 moves relative to debris barrier 38. In embodiments, a friction fit between the outer diameter of debris barrier 38 and an inner diameter of bore 30 is sufficient to hold debris barrier 38 in position. In other embodiments, a retainer can be used to retain debris barrier 38 in position.

Debris barrier 38 can have a plurality of barrier holes 50 that project axially through debris barrier 38 and spaced around a circumference of debris barrier 38. Bonnet 14 can have a plurality of bonnet holes 52 extending axially into bonnet 14. A plurality of securing members 54 pass through one of the barrier holes 50 and into one of the bonnet holes 52, securing debris barrier 38 to bonnet 14. In certain embodiments, retainer ring 56 secures an annular portion of debris barrier 38 to bonnet 14. Retainer ring 56 is a ring shaped member with an outer diameter that can be similar to an outer diameter of debris barrier 38 and an inner diameter such that retainer ring 56 does not interfere with petals 44. A face of retainer ring 56 can have holes through which securing members 54 pass. In other embodiments, there is no retainer ring 56. Other retention means, such as a dovetail groove in bonnet 14, adhesive, snap ring or gland nuts can be used to secure debris barrier 38 to bonnet 14.

In an example of operation, debris barrier 38 having one or more disk shaped members 40 can be mounted in valve assembly 10. Disk shaped members 40 are mounted in valve assembly 10 so that valve stem 16 extends through the central opening 42, urging petals 44 apart so that inner ends 48 of petals 44 point towards valve member 24 and are oriented generally axially along valve stem 16. As valve member 24 is moved towards a closed position, petals 44 will slide along valve stem 16, preventing debris on valve stem 16 from remaining on valve stem 16 as valve stem 16 continues to move farther within bore 30. Valve stem 16 can rotate relative to petals 44 as opposed to, or in addition to, moving axially along valve stem 16. Debris is therefore prevented from reaching stem, packing 32 within bore 30. Petals 44 can pass over stem sloped surface 34 to prevent debris that accumulates on valve stem 16 from, interfering with, the metal to metal seal between stem sloped surface 34 and bore sloped surface 36 that will be formed when valve member 24 is in the closed position.

The terms "vertical", "horizontal", "upward", "downward", "above", and "below" and similar spatial relation terminology are used herein only for convenience because elements of the current disclosure may be installed in various relative positions.

The system and method described herein, therefore, are well adapted to carry out the objects and attain the ends and advantages mentioned, as well as others inherent therein. While a presently preferred embodiment of the system and method, has been given for purposes of disclosure, numerous changes exist in the details of procedures for accomplishing the desired results. These and other similar modifications will readily suggest themselves to those skilled in the art, and are intended to be encompassed within the spirit of the system, and method disclosed herein and the scope of the appended claims.

What is claimed is:

1. A valve assembly, the valve assembly comprising:
   a valve body defining a flow passage and a body cavity perpendicular to the flow passage;
   a bonnet secured to the valve body;
   a valve member moveable between an open position and a closed position, the valve member blocking the flow passage in the closed position, and allowing flow through the flow passage in the open position;
   a valve stem coupled to the valve member; and
   a debris barrier circumscribing the valve stem, the debris barrier comprising a first disk shaped member with a central opening through which the valve stem is inserted and notches that extend radially from the central opening to define petals with ends that abut the valve stem, the debris barrier being a non-sealing member having a pressure of a fluid within the body cavity of the valve body balanced across the debris barrier; wherein
   the valve stem has a radially outward facing annular stem sloped surface selectively mated with a radially inward facing annular bore sloped surface to form a metal to metal seal, and wherein the petals of the debris barrier are sized to pass over the stem sloped surface of the valve stem to prevent debris from interfering with the metal to metal seal.

2. The valve assembly according to claim 1, wherein the debris barrier is fixed axially relative to the bonnet and the valve stem moves within the central opening of the debris barrier as the valve member moves between the open position and the closed position.

3. The valve assembly according to claim 1, further comprising a retainer ring, the retainer ring being ring shaped and securing an annular portion of the debris barrier to the bonnet.

4. The valve assembly according to claim 1, wherein:
the debris barrier has a plurality of barrier holes located through the debris barrier and spaced around a circumference of the debris barrier;
the bonnet has a plurality of bonnet holes, the bonnet holes extending axially into the bonnet; and
the valve assembly further comprises a plurality of securing members, each securing member passing through one of the barrier holes and into one of the bonnet holes, securing the debris barrier to the bonnet.

5. The valve assembly according to claim 1, further comprising a second disk shaped member located axially above the first disk shaped member and spaced axially apart from the first disk shaped member.

6. The valve assembly according to claim 1, further comprising a second disk shaped member located axially above the first disk shaped member and adjacent to the first disk shaped member, wherein second petals of the second disk shaped member are rotationally offset from the petals of the first disk shaped member.

7. The valve assembly according to claim 6, wherein the first disk shaped member and the second disk shaped member have a connector feature to mate the first and second disk shaped member and to restrict relative rotational movement between first disk shaped member and the second disk shaped member.

8. The valve assembly according to claim 1, further comprising a plurality of additional disk shaped members, each of the plurality of additional disk shaped members circumscribing the valve stem.

9. The valve assembly according to claim 1, wherein the ends of the petals are deflected to a direction parallel with an axis of the valve stem.

10. The valve assembly according to claim 1, wherein the petals are separated by a notch, and wherein a side of each petal is spaced apart from the sides of each adjacent petal when the debris barrier is in a relaxed state.

11. A valve assembly, the valve assembly comprising:
a valve body defining a flow passage and a body cavity perpendicular to the flow passage;
a bore extending from an exterior of the valve body through a bonnet of the valve assembly and into the body cavity;
a valve member moveable between an open position and a closed position, the valve member blocking the flow passage in the closed position, and allowing flow through the flow passage in the open position;
a valve stem coupled to the valve member, the valve stem extending through the bore, for moving the valve member between the closed position to the open position;
a stem packing circumscribing a portion of the valve stem, and located in the bore; and
a planar debris barrier in the valve body and circumscribing the valve stem, the debris barrier comprising petals with inner corners that are in contact with the valve stem, the debris barrier being a non-sealing member having a pressure of a fluid within the body cavity of the valve body balanced across the debris barrier; wherein
the valve stem has a radially outward facing annular stem sloped surface selectively mated with a radially inward facing annular bore sloped surface to form a metal to metal seal, and wherein the petals of the debris barrier are sized to pass over the stem sloped surface of the valve stem to prevent debris from interfering with the metal to metal seal.

12. The valve assembly according to claim 11, further comprising at least one additional disk shaped member, each of the additional disk shaped members circumscribing the valve stem.

13. A debris barrier system for a valve assembly, the debris barrier system comprising:
a first disk shaped member;
a central opening in the first disk shaped member, the central opening defined by a plurality of petals with notches being located between successive of the plurality of petals;
a valve stem extending through the central opening, the central opening being sized to accept the valve, with the petals urged apart by the valve stem with inner ends of the petals oriented generally axially along the valve stem; wherein
the notches define a fluid flow path from a lower side of the debris barrier to an upper side of the debris barrier equalizing an operating pressure of the valve assembly across the debris barrier; and
the valve stem has a radially outward facing annular stem sloped surface selectively mated with a radially inward facing annular bore sloped surface to form a metal to metal seal, and wherein the petals of the debris barrier are sized to pass over the stem sloped surface of the valve stem to prevent debris from interfering with the metal to metal seal.

14. The debris barrier system according to claim 13, wherein in a relaxed state, sides of each petal are spaced apart from sides of adjacent petals.

15. The debris barrier system according to claim 13, wherein the barrier further comprises a plurality of barrier holes located through the barrier and spaced around a circumference of the barrier, the plurality of barrier holes sized and spaced to accept securing members that secure the barrier to a bonnet of the valve assembly.

16. The debris barrier system according to claim 13, further comprising a retention means selectively retaining the barrier with the valve assembly, the retention means selected from a group consisting of adhesive, snap ring and gland nut.

17. The debris barrier system according to claim 13, further comprising a second disk shaped member, wherein second petals of the second disk shaped member rotationally offset from the petals of the first disk shaped member.

18. The debris barrier system according to claim 17, wherein the first disk shaped member and the second disk shaped member have a connector feature that mates the first and second disk shaped member to restrict relative rotational movement between the first disk shaped member and the second disk shaped member.

* * * * *